United States Patent [19]

Willison

[11] 4,025,063

[45] May 24, 1977

[54] CUSHIONING PAD

[75] Inventor: Donald Willison, Lyndhurst, Ohio

[73] Assignee: Midland-Ross Corporation, Cleveland, Ohio

[22] Filed: Aug. 1, 1975

[21] Appl. No.: 601,320

[52] U.S. Cl. .............................. 267/153; 267/63 R
[51] Int. Cl.² .......................................... F16F 1/36
[58] Field of Search .......... 267/153, 152, 140, 141, 267/63 R, 21 R, 21 A; 213/7, 45, 40 D; 308/238; 280/671, 687, 716; 248/24, 358, 22; 105/197 A, 199 F; 293/88, 7 R

[56] References Cited
UNITED STATES PATENTS

| | | | |
|---|---|---|---|
| 2,686,667 | 8/1954 | Willison et al. | 267/153 |
| 2,713,483 | 7/1955 | Tillou | 267/153 |
| 2,763,379 | 9/1956 | Danielson | 267/63 |
| 2,781,135 | 2/1957 | Spence et al. | 267/63 R |
| 2,907,474 | 10/1959 | Johnson | 1267/63 |
| 3,311,331 | 3/1967 | Steimen | 267/63 |
| 3,606,295 | 9/1971 | Appleton | 267/63 R |

Primary Examiner—James B. Marbert
Attorney, Agent, or Firm—Henry Kozak

[57] ABSTRACT

A cushioning pad is provided in the form of a plate member having a cushion of resilient material secured to at least one side of the plate, the cushion having novel dowel and recess means for cooperating with the recess and dowel of an adjacent similar pad to facilitate accurate gathering and alignment of a group or stack of such pads.

10 Claims, 15 Drawing Figures

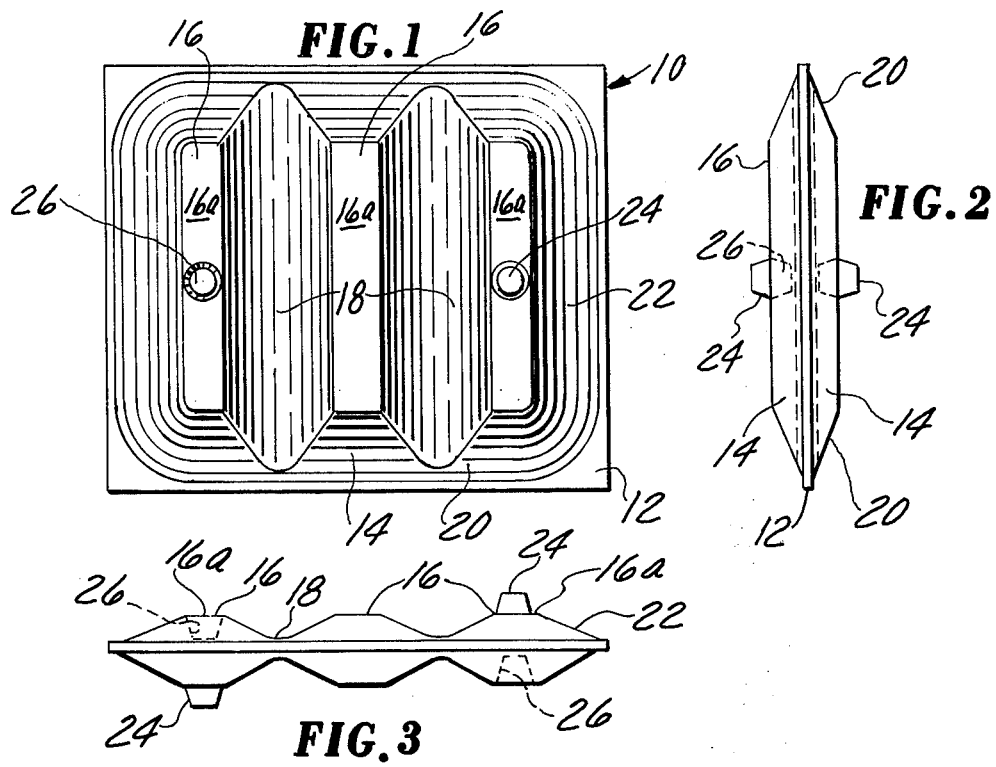
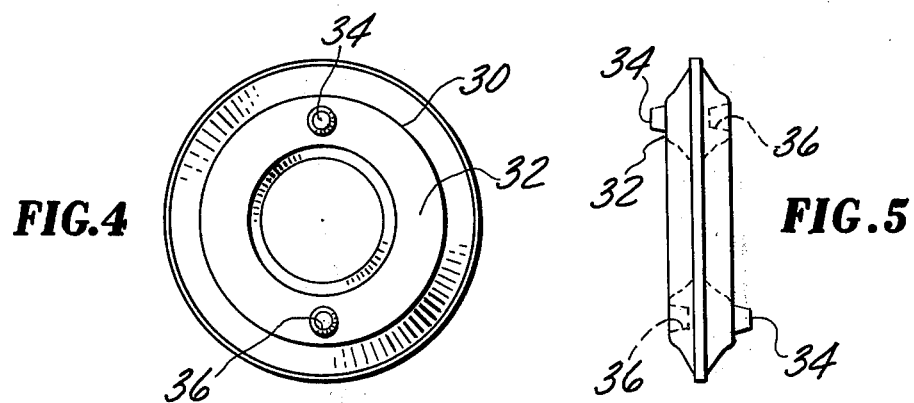
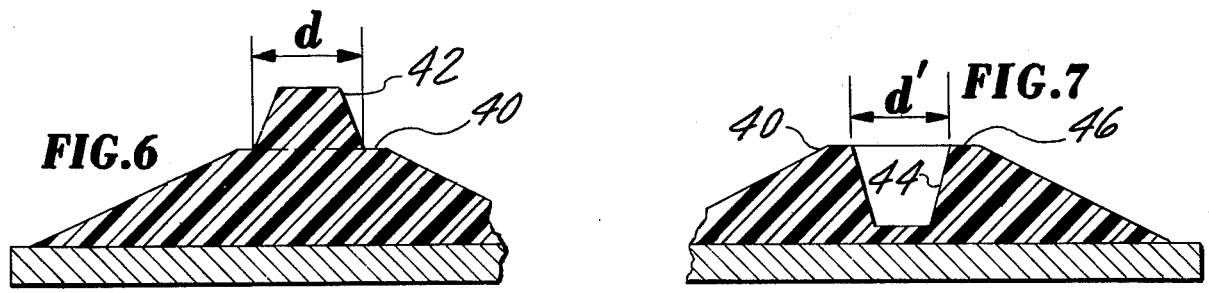

CUSHIONING PAD

BACKGROUND OF THE INVENTION

The cushioning pad embodying the present invention is of the general type shown in Willison et al U.S. Pat. No. 2,686,667 which has been used in railway cushioning devices for many years. The cushioning pad shown in that patent has cylindrical dowels for aligning the pad relative to an adjacent pad when several pads are assembled in a group. While the cylindrical dowel and corresponding recess provide a fairly accurate means of aligning the cushion of each pad relative to an adjacent cushion, each pad msut be accurately positioned relative to an opposing pad before a dowel can enter the opening. During the process of assembling such pads when one pad is laterally offset relative to an adjacent pad, no gathering action is provided by the dowels to align the pads. Manipulation of the pads to dowel them together is readily done when the assembling of the pads is performed in an open area, as on a bench where manual and visual adjustment of each pad is possible. However, when the pads are to be assembled in a casing or housing closed at one end, by application of one pad at a time, the problem of matching a dowel with an opening of an oppposing pad becomes difficult and time consuming. Accurate assembly and alignment of a group of pads within a housing such as is encountered with equipment requiring, for example, 20, 30 or more pads, becomes a painstaking operation.

SUMMARY OF THE INVENTION

The present invention provides a cushioning pad comprising a plate member having a cushion of elastomeric material such as rubber or polyurethane secured to at least one side of the plate, the cushion having a dowel extending outwardly from the cushion and having a generally conical configuration. The dowel is adapted to be received in a corresponding conical opening in the cushion of an adjacent similar pad, the tapered configuration of the dowel providing a substantial amount of gathering and aligning action as the dowel enters the opening whereby, when the dowel is fully within the opening, the cushion of the pad is in accurate alignment with the cushion of the adjacent pad. A distinctive feature of the dowel construction resides in the fact that line engagement exists between the dowel and the surface of the opening which accurately aligns the pad cushions relative to one another when the dowel is fully within the opening. This engagement may occur at the entrance to the opening or at a location within the opening. An advantage of the conical dowel configuration is that it makes possible a fit between the dowel and its recess that ranges from precise line-to-line fit, to a small interference fit, with no looseness, so that accurate alignment of a group of pads results. With cylindrical dowels and openings, the fit therebetween, due to manufacturing tolerances, must necessarily vary from a line-to-line condition to a loose fit, which looseness may cause misalignment of at least some of the pads of an assembled group.

Other features and advantages of the invention will be apparent from the following description taken in conjunction with the drawings.

BRIEF DESCRIPTION OF THE DRAWING

FIG. 1 is a plan view of a cushioning pad embodying the invention.

FIG. 2 is an end elevational view of the pad shown in FIG. 1.

FIG. 3 is a side elevational view of the pad shown in FIG. 1.

FIG. 4 is a plan view of a cushioning pad of circular configuration embodying the invention.

FIG. 5 is an end elevational view of the pad shown in FIG. 4.

FIG. 6 is an enlarged sectional view of one form of dowel applied to the cushion of a pad.

FIG. 7 is an enlarged sectional view of the portion of a pad cushion containing the opening for receiving the dowel of FIG. 6.

DESCRIPTION OF THE PREFERRED EMBODIMENT

Figure 8:
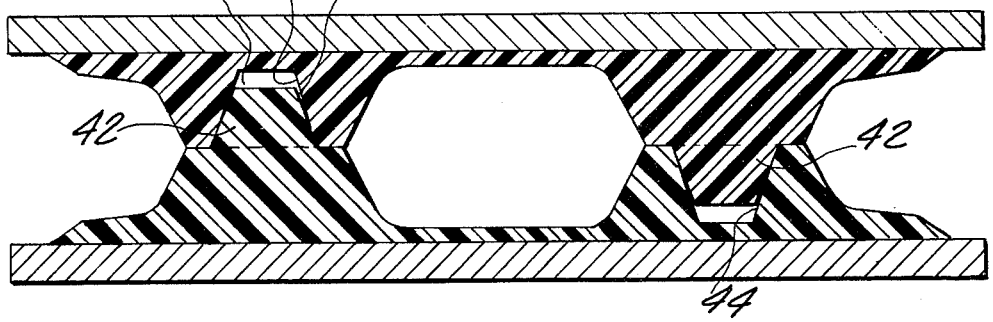
FIG. 8 is an enlarged sectional view of a pair of pads whose cushions are doweled together by the dowel and recess means shown in FIGS. 6 and 7.

Referring to FIGS. 1-3, there is shown a rectangular cushioning pad 10 comprising a flat metal plate 12 to which is secured, as by bonding or otherwise, a cushion 14 of resilient material such as rubber or polyurethane. The cushion face has a corrugated or other suitable configuration and as seen in FIG. 3, may be formed with alternate ridges 16 and valleys 18. As particularly seen in FIGS. 2 and 3, the face of cushion 12 slopes gradually upwardly from the surface of the plate as at 20 and 22 to the top of ridges 16. The top surface 16a of each ridge 16 is preferably flat. Extending away from one of end ridges 16 of each cushion 14 is dowel 24 which is in the shape of the frustum of a cone. Dowel 24 is disposed on the longitudinal center line of the pad. At the other side of the pad and also on the longitudinal center line thereof, end ridge 6 has a complementary recess 26 for receiving dowel 24 of an adjacent pad. It will be noted that on the opposite side of each pad a recess 26 and dowel 24 are provided directly opposite dowel 24 and recess 26, respectively. This arrangement of dowel and recess facilitates assembling the pads into a group or stack as will be hereinafter explained.

In FIGS. 4 and 5 there is shown a circular pad in which the cushion 30 is ring-shaped and comprises a single ridge 32. As in FIGS. 1-3, the cushion has a dowel 34 and a complementary opening 36 on each cushion, the dowel and opening being located along the same diameter of the cushion. As in FIGS. 1-3, each dowel 34 is disposed directly opposite a recess 36 on the other side of the pad.

Referring now to FIG. 6 there is shown an enlarged view of a portion of a resilient pad of the type seen in FIGS. 1–3. The ridge 40 of the cushion has a dowel 42 which has the frusto-conical configuration, the side surface of which is tapered at an angle relative to the axis of the dowel within the range of about 10° to 30°. The dowel 42 illustrated has a taper of about 25°. It will be appreciated that the larger the angle of taper the greater gathering ability of the dowel relative to the opening in which it is received. However, in view of the flexibility of the cushion material, as the angle of taper increases beyond about 30° the ease with which the dowel enters the opening decreases and consequently its gathering ability is less effective.

FIG. 7 shows the portion of a pad which contains the complementary recess 44 for receiving dowel 42 of FIG. 6. The taper of the side surface of opening 44 is slightly less than that of dowel 42 and the diameter d' at the entrance to the opening at the top surface 46 of ridge 40 is slightly less than the diameter d of the base of the dowel in FIG. 6 as measured at the top face of ridge 40. Therefore, as dowel 42 enters recess 44 of an adjacent pad the base of the dowel will engage the entrance to the opening and a slight clearance on the order of 1/64 inch may exist between the faces of the pads. At this point the dowel will be in contact with the surface of the recess at the entrance thereto, and the pad cushions will be in accurate face-to-face alignment. It will be understood that no force has as yet been applied to the pads. However, once a compressive force is applied, the slight clearance between the faces of the cushions will be taken up and the opposing cushions will be in contact. A feature of the conically shaped dowels resides in the fact that during the process of assembling several pads in a group or stack the smaller end of the dowel will readily enter the relatively large diameter of the opposing recess, after which the tapered surfaces will effectively guide the dowel fully into the opening. It will be appreciated that after the dowel has completely entered the recess, but before any compressive load has been applied to the pads, a circular line contact exists between the dowel and the edge of the opening. Such line contact provides accurate alignment of the cushions prior to seating of the faces thereof upon the application of a compressive force to the pads.

In FIG. 8 two pads having dowel and recess configuration similar to those of FIGS. 6 and 7, respectively, are shown in assembled relation, the faces of the pads being in contact. It will be noted that a substantial clearance exists between the end of dowel 42 and the bottom surface of recess 44 as at 50. Also, in view of the slight difference in the angle of taper for the dowel and the recess, the divergence of the dowel and recess surfaces produces a triangular shaped clearance 52 extending from the base of the dowel to clearance 50. As a compressive load is applied to the pads, the flow of the resilient material of the cushions will fill the clearance areas 52 and 50, after which the cushions will compress as a unitary block of the material. The dowels will, of course, maintain the pads in proper alignment during compression and expansion, as occurs in service.

Figure 9:
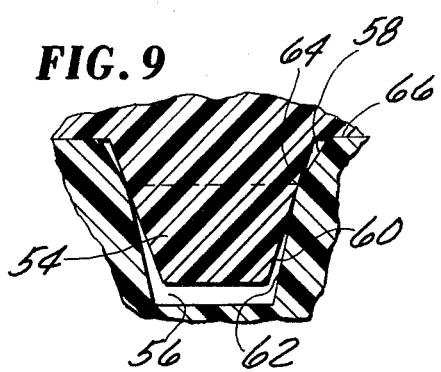
FIG. 9 is an enlarged sectional view of a modified form of dowel and recess means for a cushion of a pad.

In FIGS. 9 a modification of the invention is shown in which the dowel 54 has the same frusto-conical configuration as in the preceding FIGS. 1–8, but the dowel recess 56 has double taper side surfaces. Thus, the side surface portion 58 adjacent the recess entrance is tapered relative to the longitudinal axis of the dowel at a greater angle than side surface 60 of the dowel. The remaining side surface portion 62 of the recess is tapered at a lesser angle than dowel surface 60 whereby at the juncture 64 of surfaces 68 and 62 circular line contact occurs between the dowel and recess at a location below the face 66 of the pad cushion when the dowel is in the opening. This configuration of dowel recess 56 results in the same guiding of the dowel into the opening and accurate alignment of the pads as with the constructions shown in FIGS. 1–8. Also, this configuration serves to reduce the stresses induced at the entrance edge of the recess as the dowel expands upon the application of compressive loads to the pads.

Figure 10:
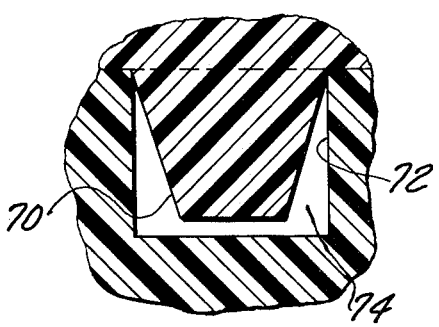
FIG. 10 is an enlarged sectional view similar to FIG. 9 showing another form of dowel and recess means.

In FIG. 10 the dowel 70 is frusto-conical as before but dowel recess 72 is cylindrical. This construction provides similar gathering and aligning action to the previous constructions described above but results in a substantially larger clearance 74 between the dowel and the side surface of the opening. This causes a greater free flow of the resilient material of the cushion under compression and consequent greater distortion of the material. Clearance 74 will result in softer action when the pad is initially subjected to a compressive load. This action may be desirable in certain cushioning applications.

Figure 11:
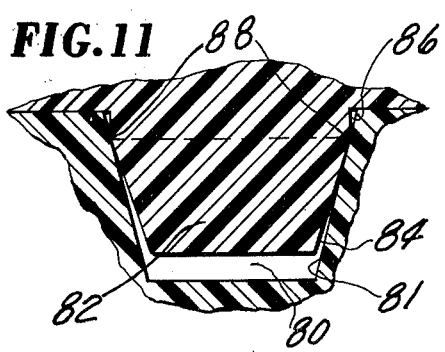
FIG. 11 is an enlarged section view similar to FIG. 9 showing a further modified form of dowel and recess means.

In FIG. 11 the dowel recess 80 has a side surface 81 having a single taper, whereas the dowel 82 has double taper side surfaces provided on the base and end sections thereof. Thus side surface 84 on the end section of dowel 82 has a greater angle of taper relative to its longitudinal axis than surface 81 of recess 80. The side surface portion 86 on the base section of the dowel is cylindrical and its diameter is such that circular line engagement occurs as at 88 between the dowel and the recess at the juncture of dowel surface portions 84 and 86 when the dowel is fully within the opening. This construction provides substantially the same gathering and aligning action as dowel 54 and recess 62 of FIG. 9 and also the circular line engagement 88 occurring below the face of the pad reduces the stress at the entrance edge of the recess, as in FIG. 9.

Figure 12:
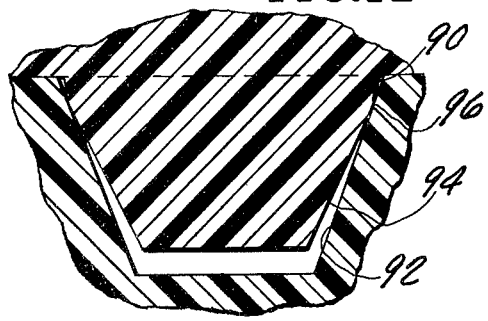
FIG. 12 is an enlarged sectional view similar to FIG. 9 showing another modified form of dowel and recess means.

In FIG. 12 the dowel and recess are similar to that of FIG. 11 but dowel surface portion 90 adjacent the base thereof is tapered. The angle of taper of surface 90 is slightly less than that of side surface 92 of the opening, while the dowel surface portion 94 is tapered at a slightly greater angle than surface 92. As in the FIG. 11 construction circular line engagement occurs as at 96 between the dowel and the opening at a point below the face of the cushion. Also in FIG. 12 the dowel is applied to a pad in which the cushion material is of greater thickness so that the dowel can be longer and the angle of taper of its surface portion 94 may be increased over that of surface 84 in FIG. 11. Thus with a dowel of increased length and increased angle of taper, the gathering ability of the dowel is greater.

It has been found that for all of the dowel configurations herein set forth in order to effect satisfactory gathering action by the dowel it is preferred that the ratio of the diameter of the dowel recess (measured at the entrance thereto) to the diameter of the tip of the dowel be in the range of about 1½ to 2. The amount of gathering in any lateral direction is equal to one-half the difference between those two diameters. The particular ratio of diameters within the above range to be selected for a given pad will be in part determined by the angle of taper of the dowel along with the thickness of the resilient cushion. For a cushion of relatively small thickness the angle of taper will generally increase because the length of the dowel is necessarily restricted. On the other hand, for a cushion of relatively large thickness the dowel can be longer and, therefore, a lesser angle of taper for the dowel can be used to obtain a diameter ratio within the 1½ to 2 range. As regards the angle of taper of the dowel, the range of about 10°-30° as given in connection with the single taper dowel of FIG. 6 also applies to the double taper dowels of FIGS. 11 and 12. For those dowels, the above range of angle of taper will apply to the dowel surface adjacent its end, as at 84 and 94 in FIGS. 11 and 12, respectively.

In connection with aforementioned range of ratio of diameters of 1½ to 2 it has been found that a gathering range for the dowel and recess of about 1/16 inch to ¼ inch generally will be obtained. This gathering range will satisfactorily gather laterally offset cushioning pads of the type herein disclosed. A typical dowel recess would have a diameter of ¾ inch, while the dowel tip would have a diameter of ½ inch, producing a ratio of 1½. This construction would give a gathering range of one-half the difference in diameters, or ⅛ inch. It will be understood that where the cushioning pads are assembled in an open area, as on a bench, lateral gathering in the amount of 1/16 inch will be quite satisfactory. However, where a large number of pads must be assembled one at a time in a confined area such as an elongated housing, a larger gathering range of ⅛ to ¼ inch would preferably be selected.

Figure 13:
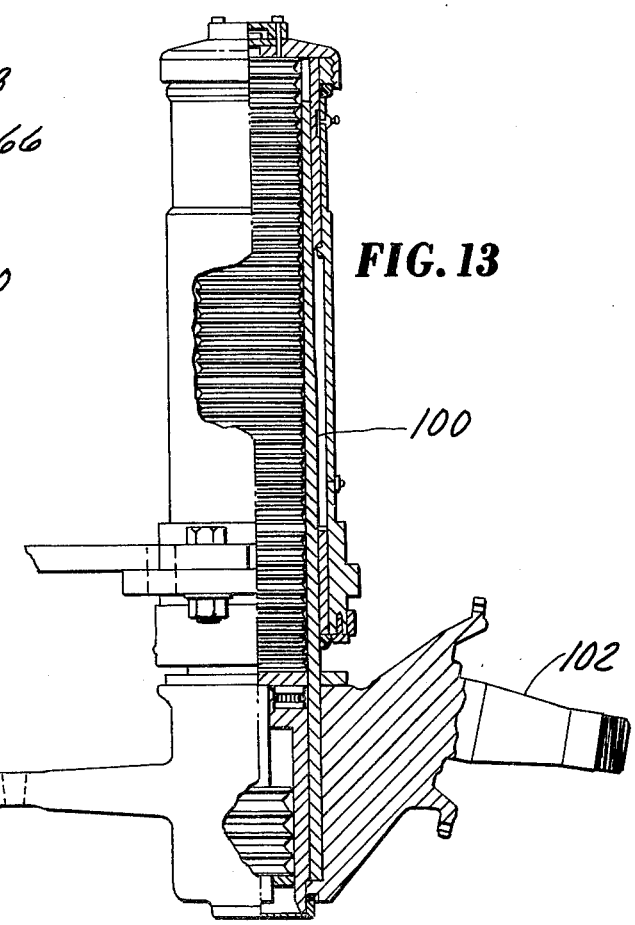
FIG. 13 is a vehicle body suspension mechanism to which a group of cushioning pads have been applied.

In FIG. 13 there is shown a body suspension unit for an off-highway truck utilizing resilient pads. This unit comprises a long inner housing 100 to which is affixed a stub axle 102 for mounting a wheel. Within housing 100 and in close fitting relation with the side wall thereof is a stack of cushioning pads of the type shown in the previous Figures. The pads are assembled by inserting them one at a time from the top or open end of cylinder 100. It will be apparent that unless each pad is applied in perfect alignment with an adjacent pad the cushion faces will not be in matching engagement. Once a pad has been inserted into the housing only slight lateral adjustment of its position is possible. With the frusto-conical dowels as previously set forth, the gathering ability thereof greatly facilitates the entry of the dowel into a corresponding recess of an adjacent pad. While some adjustment of each pad may be necessary to commence entry of the dowel ends into the recesses, once this occurs, the gathering action of the dowels assures accurate alignment of the cushions as the dowels enter fully into the openings. In this manner precise alignment of the entire stack of pads is readily accomplished. With cylindrical dowels having close fitting cylindrical recesses alignment of stack of pads within a container such as housing 100 is difficult and time consuming.

Figure 14:
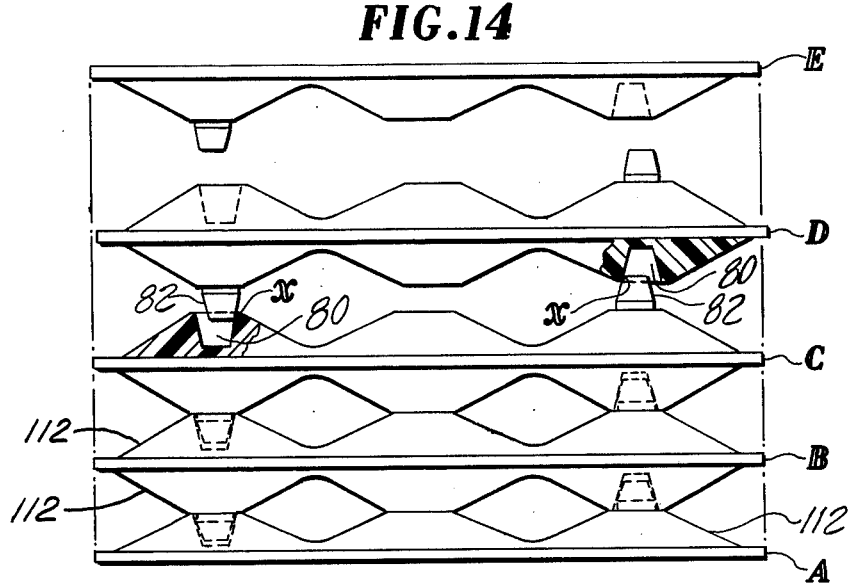
FIG. 14 is a side elevational view of a group of cushioning pads embodying the invention, illustrating the functioning of the dowels in gathering and aligning the pads as they are assembled.

FIG. 14 shows a group of pads having dowels and recesses of the type shown in FIG. 11 in the process of being assembled. End pad A which has a resilient cushion 112 on one side only is shown in accurate alignment and in doweled relationship with adjacent full pad B. Likewise pad B is in doweled relationship with pad C. Pad D is in the process of being assembled with pad C and is offset laterally to the right, with tip of each dowel 82 in engagement with the side surface of recess 80 adjacent the entrance thereto as at x. As pad D is moved toward pad C, the aligning action of the tapered dowels will shift pad D toward the left as the dowels enter their respective openings. When the dowels are completely within the openings, pad D will be in accurate alignment with pad C. End pad E is shown in approximate alignment with pads A, B, and C and will, therefore, readily be accurately aligned by the dowels with pad D, after the latter is assembled with pad C, to complete the assembly of the entire group. It will be appreciated that when the pads are assembled in an open area, as on a bench, no serious problem is encountered in doweling the pads together. However, when assembly of a large number of pads within a closely confined area such as a housing of the type shown in FIG. 13 must be accomplished, the gathering action of the dowel becomes readily apparent.

Figure 15:
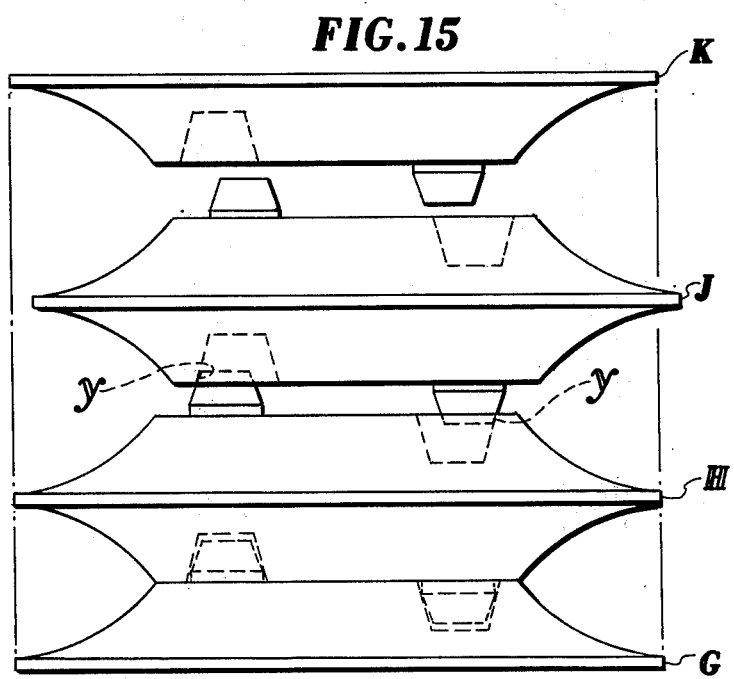
FIG. 15 is a view similar to FIG. 14 showing the assembly of another group of pads embodying the invention.

In FIG. 15 a group of pads having dowels and recesses of the type shown in FIG. 12 are shown in the process of being assembled. End pad G has been doweled to the adjacent full pad H. Pad J is laterally offset to the right, with the tip of its dowel just entering the corresponding recess at at y. As pad J is moved upward toward pad H, the aligning action of the dowels will shift pad D to the left as the dowels enter deeper into their corresponding recesses. After the dowels are completely within the openings pad D will be in accurate alignment with pad H. Thereafter end pad K, which is substantially in alignment with pads H and G, can be readily doweled to pad J.

The various dowel configurations disclosed herein are such that after a dowel has entered its recess, contact between the dowel and the recess surface occurs at the entrance edge of the recess or at a short distance within the recess. In this manner little, if any, compression of the dowel occurs when the faces of the pad cushions engage. If the dowels were constructed so that the edge of the tip of the dowel were to contact the side surface of the recess before the pad faces were in contact, compression of the dowel would result. Such compression of the dowel would have the undesirable effect of tending to separate the cushions upon release of the compression load and thereby destroy the natural adhesion existing between the pad faces. By making the angle of taper of the dowel surface greater than that of the dowel recess, the above undesirable condition is avoided.

What is claimed is:

1. A cushioning pad for assembly with other similar pads into a group, said pad comprising a plate member having a cushion of resilient material secured to at least one side thereof, and means for gathering and aligning said pad relative to another similar pad whereby said cushion is directly in contact with the cushion of the other pad, said means comprising an integral dowel in the shape of the frustum of a cone extending outwardly from the face of said cushion and a corresponding frusto-conically shaped dowel receiving recess in the face of the cushion and being spaced from said dowel, said dowel having a side surface whose taper relative to the longitudinal centerline thereof is slightly greater than the taper of the side surface of said recess, the taper of said side surface of the dowel being of such an angle as to effect gathering action between said dowel and the surface of the recess of the adjacent laterally displaced similar pad whereby said cushion is brought into accurate alignment with the opposing cushion when said pad is assembled with another similar pad, the engagement between said dowel and recess ranging from line to line fit to an interference fit when said dowel is within said recess.

2. The cushioning pad of claim 1 in which the angle of taper of said side surface of the dowel is in the range of about 10° to 30°.

3. The cushioning pad of claim 1 in which the length of said dowel is less than the depth of said recess.

4. The cushioning pad of claim 3 in which the lateral gathering capability of said dowel relative to said recess of an opposing similar pad is in the range of about 1/16 to ¼ inch.

5. The cushioning pad of claim 1 in which the diameter of said recess measured at the face of said cushion is in the range of about 1½ to 2 times the diameter of the tip of said dowel.

6. The cushioning pad of claim 1 in which said dowel has another side surface adjacent the base thereof adjoining said first mentioned side surface, said other surface being disposed at an angle less than that of said side surface of said recess, the diameter of the juncture of said dowel surfaces being of such dimension that engagement occurs between said juncture and said side surface of the recess of an opposing pad at a location below the face of the cushion of the opposing pad when said dowel enters the recess.

7. A cushioning pad for assembly with other similar pads into a group, said pad comprising a plate member having a cushion of resilient material secured to at least one side thereof, and means for gathering and aligning said pad relative to another similar pad whereby said cushion is directly in contact with the cushion of the other pad, said means comprising an integral dowel in the shape of the frustum of a cone extending outwardly from the face of said cushion and a corresponding frusto-conically shaped recess in the face of the cushion, said recess being spaced from said dowel and adapted to receive the dowel of another similar pad, said dowel comprising an end section and a base section, the side surfce of said section being disposed at a greater angle relative to the longitudinal centerline of the dowel than the side surface of said recess, and the side surface of said base section being disposed at an angle slightly less than that of said side surface of the recess, the diameter of said dowel at the juncture of said end and base sections being of such dimension that engagement occurs between said juncture and said side surface of the recess at a location below the face of the cushion of an opposing pad when said dowel enters the recess.

8. The cushioning pad of claim 7 in which the diameter of said recess at the face of said cushion is in the range of about 1½ to 2 times the diameter of the tip of said dowel.

9. A cushioning pad for assembly with other similar pads into a group, said pad comprising a plate member having a cushion of resilient material secured to at least one side thereof, and means for aligning said pad relative to another similar pad whereby said cushion is directly in contact with the cushion of the other pad, said means comprising an integral dowel in the shape of the frustum of a cone, extending outwardly from the face of said cushion and a corresponding frusto-conically shaped recess in the face of the cushion, said recess being spaced from said dowel and adapted to receive the dowel of another similar pad, the side surface of said recess adjacent the face of the cushion being disposed at a greater angle relative to the longitudinal centerline of the dowel than the side surface of said dowel, and the side surface of said recess adjacent the bottom thereof being disposed at an angle less than that of said side surface of the dowel, the diameter of said opening at the juncture of said recess surfaces being of such dimension that engagement occurs between said juncture and said side surface of the dowel at a location below the face of the cushion of an opposing pad when said dowel enters said recess thereof.

10. The cushioning pad of claim 9 in which the lateral gathering capability of said dowel relative to said recess of an opposing similar pad is in the range of about 1/16 to ¼ inch.

* * * * *

UNITED STATES PATENT AND TRADEMARK OFFICE
CERTIFICATE OF CORRECTION

PATENT NO. : 4025063
DATED : May 24, 1977
INVENTOR(S) : Donald Willison

It is certified that error appears in the above–identified patent and that said Letters Patent are hereby corrected as shown below:

Col. 1, line 14, "msut" should be --must--.

Col. 2, line 55, "6" should be --16--.

Col. 3, line 66, "FIGS." should be --FIG.--.

Col. 6, line 17, "dowel" should be --dowels--; line 23, "at", first occurance, should be --as--; same line, delete "upward".

Col. 7, line 40, "surfce" should be --surface--; same line, after "said" insert --end--.

Signed and Sealed this

Twentieth Day of September 197

[SEAL]

Attest:

RUTH C. MASON
Attesting Officer

LUTRELLE F. PARKER
Acting Commissioner of Patents and Trademark